(12) United States Patent
Huang et al.

(10) Patent No.: US 12,262,135 B2
(45) Date of Patent: Mar. 25, 2025

(54) PIXEL READING DEVICE AND PIXEL READING METHOD

(71) Applicant: Novatek Microelectronics Corp., Hsinchu (TW)

(72) Inventors: Min Huang, Taoyuan (TW); Chi-Ting Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 144 days.

(21) Appl. No.: 18/320,998

(22) Filed: May 22, 2023

(65) Prior Publication Data

US 2024/0397231 A1    Nov. 28, 2024

(51) Int. Cl.
*H04N 25/772* (2023.01)
*G06V 40/13* (2022.01)
*H04N 21/44* (2011.01)

(52) U.S. Cl.
CPC ....... *H04N 25/772* (2023.01); *G06V 40/1318* (2022.01)

(58) Field of Classification Search
CPC ...... H04N 25/77; H04N 25/772; H04N 25/76; H04N 21/4415; G06V 40/1318
See application file for complete search history.

(56) References Cited

U.S. PATENT DOCUMENTS

| | | | |
|---|---|---|---|
| 11,450,132 B2 | 9/2022 | Shih et al. | |
| 11,503,241 B2 | 11/2022 | Chen | |
| 11,503,242 B2 | 11/2022 | Chen | |
| 11,636,702 B2 | 4/2023 | Krah et al. | |
| 11,823,486 B2 | 11/2023 | Krah et al. | |
| 2018/0211819 A1* | 7/2018 | Berget | G06V 40/1306 |
| 2018/0260608 A1* | 9/2018 | Liao | G06V 40/1318 |
| 2019/0102591 A1* | 4/2019 | Lee | G06F 3/0443 |
| 2020/0210673 A1 | 7/2020 | Krah et al. | |
| 2021/0248342 A1 | 8/2021 | Chen | |
| 2021/0250537 A1 | 8/2021 | Chen | |

(Continued)

FOREIGN PATENT DOCUMENTS

| | | |
|---|---|---|
| CN | 212210968 | 12/2020 |
| TW | 1750027 | 12/2021 |
| TW | 202230102 | 8/2022 |

OTHER PUBLICATIONS

"Office Action of Taiwan Counterpart Application", issued on May 20, 2024, p. 1-p. 4.

*Primary Examiner* — Marly S Camargo
(74) *Attorney, Agent, or Firm* — JCIPRNET (57) ABSTRACT

A pixel reading device, which includes a first capacitor, a second capacitor, a voltage generating circuit, and an analog front-end (AFE) circuit, is provided. A first terminal of the first capacitor is coupled to a fingerprint sensing pixel to receive a sensing voltage. A first terminal of the second capacitor is coupled to a second terminal of the first capacitor. The voltage generating circuit provide a compensation voltage to a second terminal of the second capacitor. During a sensing period of the fingerprint sensing pixel, the compensation voltage is at an initial level. During a level reading period of the fingerprint sensing pixel, the compensation voltage is pulled up from the initial level to a compensation level to compensate a common mode component of the sensing voltage. An input terminal of the AFE circuit is coupled to the second terminal of the first capacitor.

10 Claims, 8 Drawing Sheets

(56) References Cited

U.S. PATENT DOCUMENTS

| | | |
|---|---|---|
| 2021/0357615 A1 | 11/2021 | Shih et al. |
| 2023/0070145 A1* | 3/2023 | Chen .................. G06V 40/1318 |
| 2023/0230414 A1 | 7/2023 | Krah et al. |

* cited by examiner

PIXEL READING DEVICE AND PIXEL READING METHOD

BACKGROUND

Technical Field

The disclosure relates to an electronic device, and more particularly to a pixel reading device and a pixel reading method.

Description of Related Art

Organic light-emitting diode (OLED) display panel is widely used in various electronic devices. Electronic devices equipped with OLED display panels often require fingerprint sensing. Therefore, there are some OLED display panels with embedded fingerprint sensing pixel array. Based on the process of the OLED display panel, the fingerprint sensing pixel array embedded in the OLED display panel adopts a P-type metal-oxide-semiconductor (PMOS) transistor architecture. Usually, the output voltage (sensing voltage) of the fingerprint sensing pixel embedded in the OLED display panel falls in a negative pressure range. One of the many technical challenges in this field is how to read the output voltage of the fingerprint sensing pixel embedded in the OLED display panel.

It should be noted that the content of the "BACKGROUND" section is used to help understand the disclosure. Some of the content (or all of the content) disclosed in the "BACKGROUND" section may not be known by those of ordinary skill in the art. The content disclosed in the "BACKGROUND" section does not mean that the content has been known to those with ordinary knowledge in the technical field before the application of the disclosure.

SUMMARY

The disclosure provides a pixel reading device and a pixel reading method to read an output voltage (sensing voltage) of a fingerprint sensing pixel embedded in a display panel.

In an embodiment of the disclosure, the above pixel reading device includes a first capacitor, a second capacitor, a voltage generating circuit, and an analog front-end (AFE) circuit. The first capacitor has a first terminal coupled to a fingerprint sensing pixel to receive a sensing voltage. The second capacitor has a first terminal coupled to a second terminal of the first capacitor. The voltage generating circuit is coupled to a second terminal of the second capacitor to provide a compensation voltage. The compensation voltage is at an initial level during a sensing period of the fingerprint sensing pixel. Moreover, the compensation voltage is pulled up from the initial level to a compensation level during a level reading period of the fingerprint sensing pixel to compensate a common mode component of the sensing voltage. The AFE circuit has an input terminal coupled to the second terminal of the first capacitor.

In an embodiment of the disclosure, the pixel reading method is described below. A sensing voltage of a fingerprint sensing pixel is received from an input terminal of an AFE circuit through a first capacitor. A compensation voltage is provided to the input terminal of the AFE circuit by a voltage generating circuit through a second capacitor. The compensation voltage is at an initial level during a sensing period of the fingerprint sensing pixel. Moreover, during a level reading period of the fingerprint sensing pixel, the compensation voltage is pulled up from the initial level to a compensation level to compensate a common mode component of the sensing voltage.

Based on the above, the pixel reading device in various embodiments of the disclosure may read and compensate the common mode component of the sensing voltage of the fingerprint sensing pixel. In response to the fingerprint sensing pixel being reset, the sensing voltage is pulled down to a reset level (e.g., negative voltage level). During the level reading period of the fingerprint sensing pixel, the compensation voltage is instantly pulled up from the initial level to the compensation level to compensate the common mode component of the sensing voltage. Thus, the voltage of the input terminal of the AFE circuit may operate in a positive voltage range, so that the AFE circuit may read the output voltage (sensing voltage) of the fingerprint sensing pixel embedded in the display panel.

In order to make the above-mentioned features and advantages of the disclosure comprehensible, embodiments accompanied with drawings are described in detail below.

DESCRIPTION OF THE EMBODIMENTS

The term "coupled (or connected)" as used throughout this specification (including the scope of the application) may refer to any direct or indirect means of connection. For example, if it is described in the specification that a first device is coupled (or connected) to a second device, it should be construed that the first device can be directly connected to the second device, or the first device can be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements.

In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

Figure 1:
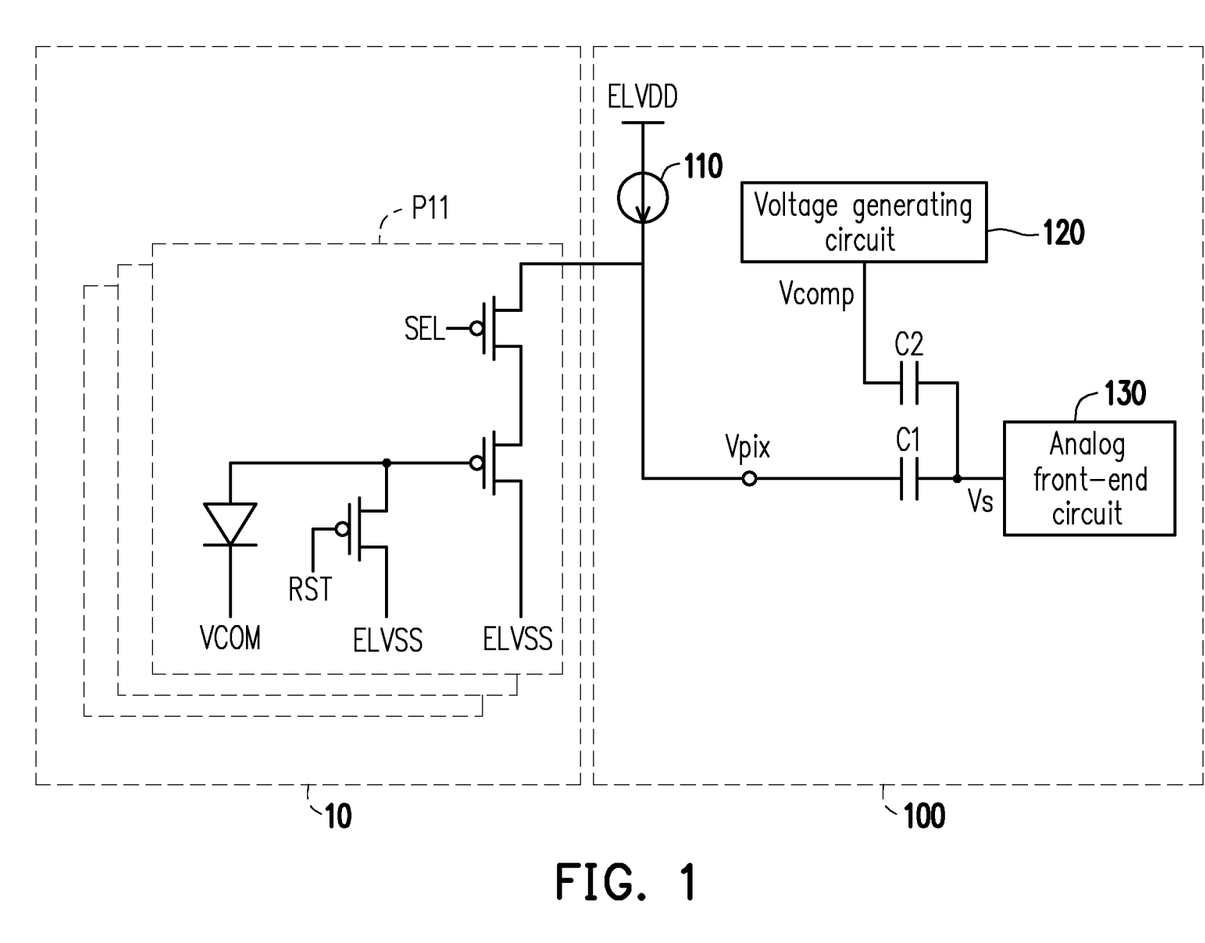
FIG. 1 is a schematic circuit block diagram of a display device according to an embodiment of the disclosure.

FIG. 1 is a schematic circuit block diagram of a display device according to an embodiment of the disclosure. The display device shown in FIG. 1 includes a display panel 10 and a pixel reading device 100. The display panel 10 may be an organic light-emitting diode (OLED) display panel or other types of display panels. The fingerprint sensing pixel array embedded in the display panel 10 includes multiple fingerprint sensing pixels, for example, the fingerprint sensing pixel P11 shown in FIG. 1. Based on the process of the OLED display panel, the fingerprint sensing pixel array embedded in the display panel 10 adopts a P-type metal-oxide-semiconductor (PMOS) transistor architecture. The circuit diagram of the fingerprint sensing pixel P11 shown in FIG. 1 is only an exemplary schematic diagram. The specific implementation of the fingerprint sensing pixel P11 may be determined according to the actual design. Actual voltage levels of the common voltage VCOM, the power voltage ELVDD, and the reference voltage ELVSS shown in FIG. 1 may be determined according to the actual design. For example (but not limited to), the common voltage VCOM may be −2 V (volts), the power voltage ELVDD may be +5 V, and the reference voltage ELVSS may be −5 V.

Based on a scanning sequence, in response to a selection signal SEL selecting/scanning the fingerprint sensing pixel P11, a sensing current of a current source 110 of the pixel reading device 100 may be input to the fingerprint sensing pixel P11, and then the optical sensing result of the fingerprint sensing pixel P11 is converted into a sensing voltage Vpix. During a sensing period of the fingerprint sensing pixel P11, a reset signal RST has not yet reset the fingerprint sensing pixel P11, and at this time the pixel reading device 100 may read the optical sensing result of the fingerprint sensing pixel P11. It is assumed that the sensing voltage Vpix at this time is a certain signal level. At this time, the sensing voltage Vpix has a common mode (CM) component and a differential mode (DM) component. During the level reading period, since the reset signal RST resets the fingerprint sensing pixel P11, the sensing voltage Vpix of the fingerprint sensing pixel P11 is reset to a certain reset level. At this point, the pixel reading device 100 may read the reset level. Based on a difference between the reset level and the signal level, the system may determine the optical sensing result of the fingerprint sensing pixel P11.

In the embodiment shown in FIG. 1, the pixel reading device 100 includes a current source 110, a capacitor C1, a capacitor C2, a voltage generating circuit 120, and an analog front-end (AFE) circuit 130. The current source 110 is coupled to the fingerprint sensing pixel P11 to provide the sensing current. A first terminal of the capacitor C1 is coupled to the fingerprint sensing pixel P11 to receive the sensing voltage Vpix. A first terminal of the capacitor C2 is coupled to a second terminal of the capacitor C1. The voltage generating circuit 120 is coupled to a second terminal of the capacitor C2 to provide a compensation voltage Vcomp. An input terminal of the AFE circuit 130 is coupled to the second terminal of the capacitor C1 to receive a sensing voltage Vs.

Figure 2:
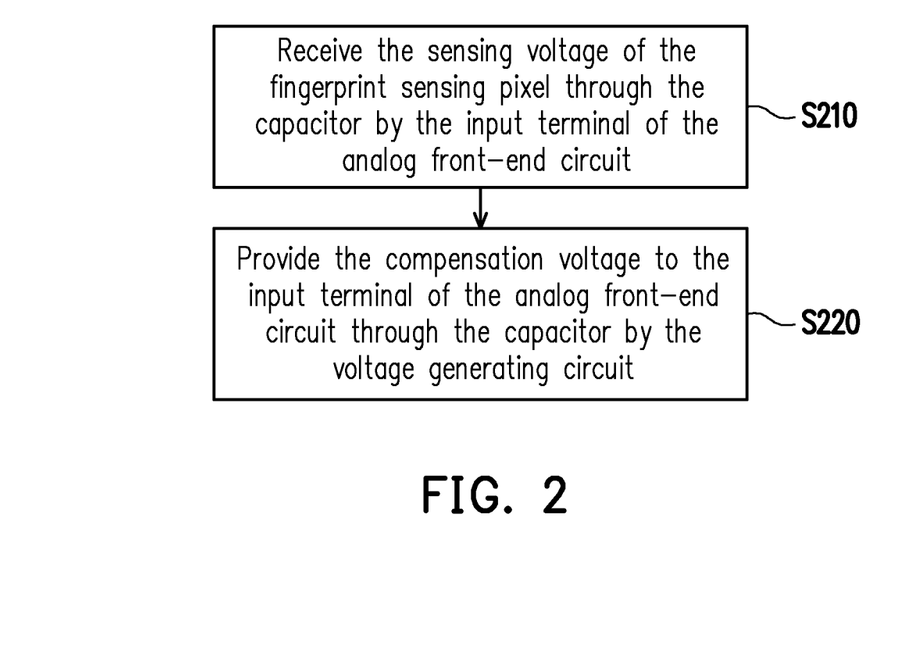
FIG. 2 is a flowchart of a pixel reading method according to an embodiment of the disclosure.

FIG. 2 is a flowchart of a pixel reading method according to an embodiment of the disclosure. Referring to FIG. 1 and FIG. 2, in step S210, the input terminal of the AFE circuit 130 receives the sensing voltage Vpix of the fingerprint sensing pixel P11 through the capacitor C1. In step S220, the voltage generating circuit 120 provides the compensation voltage Vcomp to the input terminal of the AFE circuit 130 through the capacitor C2.

Figure 3:
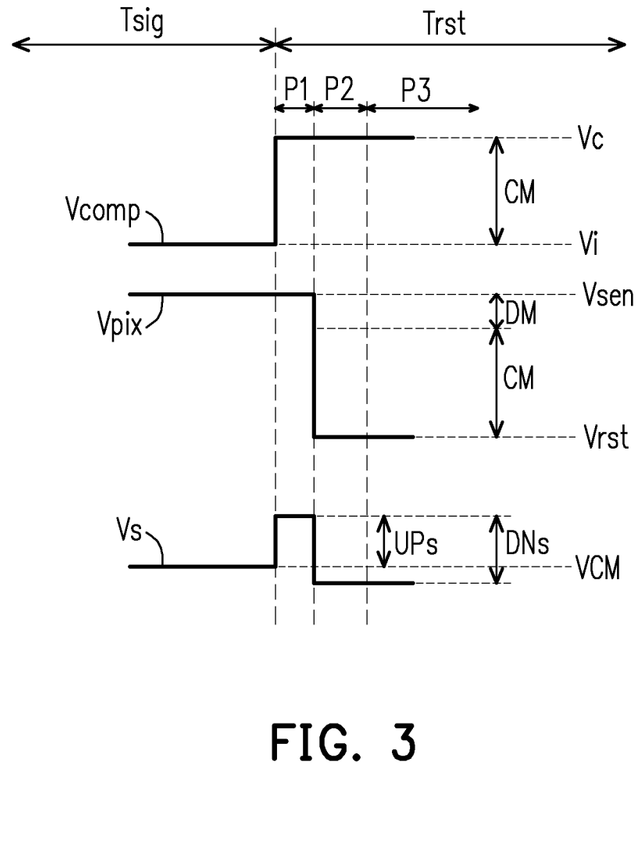
FIG. 3 is a waveform schematic diagram of a compensation voltage and a sensing voltage according to an embodiment of the disclosure.

FIG. 3 is a waveform schematic diagram of the sensing voltage Vpix, the compensation voltage Vcomp, and the sensing voltage Vs according to an embodiment of the disclosure. The horizontal axis in FIG. 3 represents time. Referring to FIG. 1 and FIG. 3, during a sensing period Tsig of the fingerprint sensing pixel P11, the reset signal RST has not yet reset the fingerprint sensing pixel P11. It is assumed that the sensing voltage Vpix at this time is a certain signal level Vsen. At this time, the sensing voltage Vpix has a common mode component CM and a differential mode component DM. During a level reading period Trst, since the reset signal RST resets the fingerprint sensing pixel P11, the sensing voltage Vpix of the fingerprint sensing pixel P11 is reset to a certain reset level Vrst.

The compensation voltage Vcomp is at an initial level Vi during the sensing period Tsig of the fingerprint sensing pixel P11. The initial level Vi may be determined according to the actual design. For example, the initial level Vi may be 0 V or other levels. Moreover, during the level reading period Trst of the fingerprint sensing pixel P11, the compensation voltage Vcomp is pulled up from the initial level Vi to a compensation level Vc to compensate the common mode component CM of the sensing voltage Vpix. The compensation level Vc may be determined according to the actual design. For example, the compensation level Vc may be the initial level Vi plus the common mode component CM (e.g., common mode voltage VCM), or the compensation level Vc may be other levels.

In a first phase P1 of the level reading period Trst, the sensing voltage Vpix of the fingerprint sensing pixel P11 has not yet been reset, and the compensation voltage Vcomp is pulled up to the compensation level Vc. At this time, the voltage generating circuit 120 may pull up the sensing voltage Vs through the capacitor C2. A boosting range UPs of the sensing voltage Vs is related to the capacitor C1, the capacitor C2, and the differential mode component DM. In a second phase P2 of the level reading period Trst, the sensing voltage Vpix is reset to the reset level Vrst, and the compensation voltage Vcomp continues to be pulled up to the compensation level Vc. At this time, the sensing voltage Vpix of the fingerprint sensing pixel P11 may pull down the sensing voltage Vs through the capacitor C1. The step-down range DNs of the sensing voltage Vs is related to the capacitor C1, the capacitor C2, and the differential mode component DM. In a third phase P3 of the level reading period Trst, the sensing voltage Vpix is continuously reset at the reset level Vrst, and the compensation voltage Vcomp is maintained at the compensation level Vc.

The voltage generating circuit 120 may pull up the sensing voltage Vs through the capacitor C2 to compensate the common mode component CM of the sensing voltage Vpix. In response to the sensing voltage Vpix of the fingerprint sensing pixel P11 being reset, a negative variation of the sensing voltage Vpix is Vrst−Vsen=Vrst−(Vrst+VCM+VDM)=−VCM−VDM. VCM is a voltage difference (common mode voltage) of the common mode component CM, and VDM is a voltage difference (differential mode voltage) of the differential mode component DM. The voltage generating circuit 120 may pull up the compensation voltage Vcomp, where a positive variation of the compensation voltage Vcomp is Vc−Vi=VCM. The positive variation VCM of the compensation voltage Vcomp may offset the −VCM item in the negative variation −VCM−VDM of the sensing voltage Vpix. That is, the sensing voltage Vs only leaves the −VDM item in the negative variation of the sensing voltage Vpix. The compensated sensing voltage Vs is transmitted to the AFE circuit 130 without being affected by the VCM item. The sensing voltage Vs is pulled up and down and eventually return close to the common mode voltage VCM. Thus, the output of the AFE circuit 130 is not saturated and distorted due to a large common mode component CM of the sensing voltage Vpix.

The following is explained with a specific example, how the voltage generation circuit 120 compensates the common mode component CM of the sensing voltage Vpix through the capacitor C2, enabling the sensing voltage Vs to operate in a positive voltage range. The input terminal voltage (sensing voltage Vs) of the AFE circuit 130 may be operated in the positive voltage range, so that the AFE circuit 130 may read the sensing voltage Vpix of the fingerprint sensing pixel P11 embedded in the display panel 10 through the capacitor C1.

Figure 4:
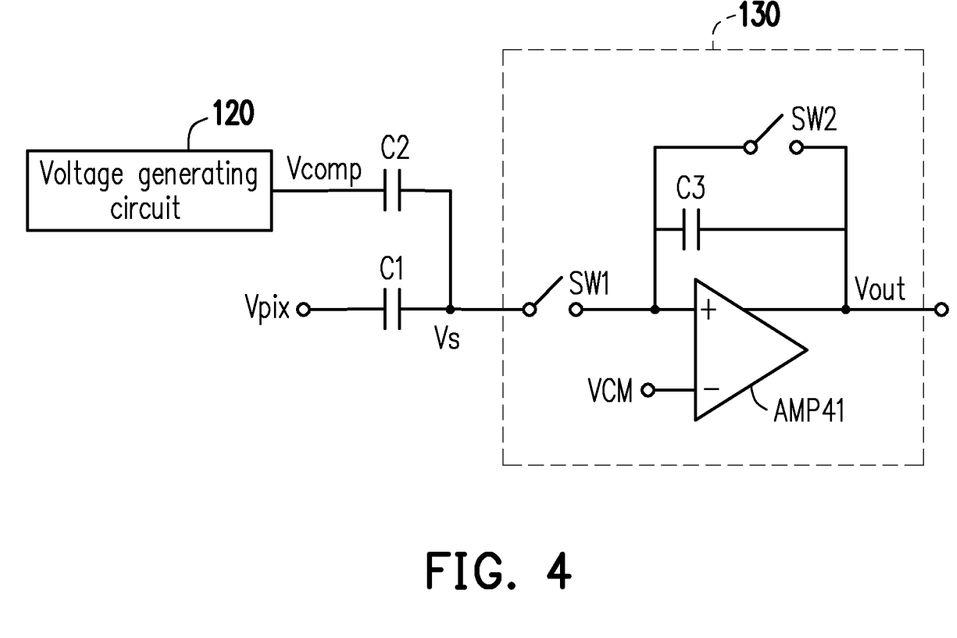
FIG. 4 is a schematic circuit block diagram of an analog front-end (AFE) circuit according to an embodiment of the disclosure.

FIG. 4 is a schematic circuit block diagram of the AFE circuit 130 according to an embodiment of the disclosure. The AFE circuit 130 shown in FIG. 4 may be used as one of many implementation examples of the AFE circuit 130 shown in FIG. 1. The AFE circuit 130 shown in FIG. 4 includes a switch SW1, an amplifier AMP41, a capacitor C3, and a switch SW2. A first terminal of the switch SW1 is coupled to the second terminal of the capacitor C1 to receive the sensing voltage Vs. A first input terminal (e.g., non-inverting input terminal) of the amplifier AMP41 is coupled to a second terminal of the switch SW1. A second input terminal of the amplifier AMP41 (e.g., inverting input terminal) is coupled to the common mode voltage VCM. The level of the common mode voltage VCM may be determined according to the actual design. A first terminal of the capacitor C3 is coupled to the first input terminal of the amplifier AMP41. A second terminal of the capacitor C3 is coupled to an output terminal of the amplifier AMP41. The output terminal of the amplifier AMP41 may provide an output voltage Vout to the next stage circuit (not shown). A first terminal of the switch SW2 is coupled to the first input terminal of the amplifier AMP41. A second terminal of the switch SW2 is coupled to the output terminal of the amplifier AMP41.

Referring to FIG. 3 and FIG. 4, during the sensing period Tsig, the sensing voltage Vpix has not yet been reset (assuming that the sensing voltage Vpix at this time is a certain signal level Vsen). At this time, the AFE circuit 130 is in a reset state (the switch SW2 is turned on), the switch SW1 is turned on, and the compensation voltage Vcomp is at the initial level Vi (e.g., 0 V or other fixed levels). Thus, the sensing voltage Vs is the common mode voltage VCM. At the end of the sensing period Tsig, voltages at two terminals of the capacitor C1 are the signal level Vsen and the common mode voltage VCM, respectively. Voltages at two terminals of the capacitor C2 are the initial level Vi and the common mode voltage VCM, respectively. Thus, a total charge amount q0 of the capacitor C1 and the capacitor C2 during the sensing period Tsig is represented by the following equation 1.

$$q0 = C1 \cdot (VCM - Vsen) + C2 \cdot (VCM - Vi) \quad \text{Equation 1}$$

In the first phase P1 of the level reading period Trst, the sensing voltage Vpix has not yet been reset (assumed to be the signal level Vsen). At this time, the AFE circuit 130 is in a normal operation state (the switch SW2 is turned off), the switch SW1 is turned off, and the compensation voltage Vcomp is pulled up from the initial level Vi to the compensation level Vc. Thus, voltages at two terminals of the capacitor C1 are Vsen and Vph1=[(C1+2*C2)/(C1+C2)]*VCM, respectively, and voltages at two terminals of the capacitor C2 are Vc and Vph1, respectively. Vph1 indicates a voltage level of the sensing voltage Vs in the first phase P1. A total charge amount q1 of the capacitor C1 and the capacitor C2 in first phase P1 is represented by the following equation 2.

$$q1 = C1 \cdot (Vph1 - Vsen) + C2 \cdot (Vph1 - Vc) \quad \text{Equation 2}$$

For the convenience of description, it is assumed here that the initial level Vi is 0 V, and the electric capacities of the capacitor C1 and the capacitor C2 are both C. Based on the assumed test scenario, equation 1 and equation 2 above may be rewritten as equation 3 and equation 4 below. In the second phase P2 of the level reading period Trst, the sensing voltage Vpix is reset (assumed to be the reset level Vrst). At this time, the AFE circuit 130 is in a normal operation state (the switch SW2 is turned off), the switch SW1 is turned off, and the compensation voltage Vcomp continues to be pulled up to the compensation level Vc. Thus, voltages at two terminals of the capacitor C1 are Vrst and Vph2, respectively, and voltages at two terminals of the capacitor C2 are Vc and Vph2, respectively. Vph2 indicates a voltage level of the sensing voltage Vs in the second phase P2. A total charge amount q2 of the capacitor C1 and the capacitor C2 in the second phase P2 is represented by the following equation 5. In a third phase P3 of the level reading period Trst, the sensing voltage Vpix is continuously reset at the reset level Vrst, and the compensation voltage Vcomp is maintained at the compensation level Vc. At this time, the AFE circuit 130 is in a normal operation state (the switch SW2 is turned off), and the switch SW1 is turned on. Thus, voltages at two terminals of the capacitor C1 are Vrst and VCM, respectively, voltages at two terminals of the capacitor C2 are Vc and VCM, respectively, and voltages at two terminals of the capacitor C3 are Vout and VCM, respectively. A total charge amount q3 of the capacitor C1 and the capacitor C2 in the third phase P3 is represented by the following equation 6.

$$q0 = C \cdot (VCM - Vsen) + C \cdot (VCM - 0) \quad \text{Equation 3}$$

$$q1 = C \cdot (Vph1 - Vsen) + C \cdot (Vph1 - Vc) \quad \text{Equation 4}$$

$$q2 = C \cdot (Vph2 - Vrst) + C \cdot (Vph2 - Vc) \quad \text{Equation 5}$$

$$q3 = C \cdot (VCM - Vrst) + C \cdot (VCM - Vc) + C3 \cdot (VCM - Vout) \quad \text{Equation 6}$$

Since the total charge amount is conserved, q0=q1 when entering the first phase P1 from the sensing period Tsig, so Vph1=VCM+0.5*Vc. Since the total charge amount is conserved, q1=q2 from the first phase P1 to the second phase P2, so Vph2=VCM+0.5*Vc+0.5*(−VCM−VDM). It is assumed that Vc=VCM, then Vph2=VCM+0.5*(−VDM). After compensation, the voltage Vph2 (voltage level of the sensing voltage Vs in the second phase P2) is quite close to the common mode voltage VCM. Since the total charge amount is conserved, q2=q3 from the second phase P2 to the third phase P3, so Vout=VCM+(C/C3)VDM. It can be seen that the final output voltage Vout does not include the common mode component CM of the pixel signal, only the differential mode component DM is left. If this compensation is not performed, the output voltage Vout is saturated and distorted due to the common mode component CM of this pixel.

Figure 5:
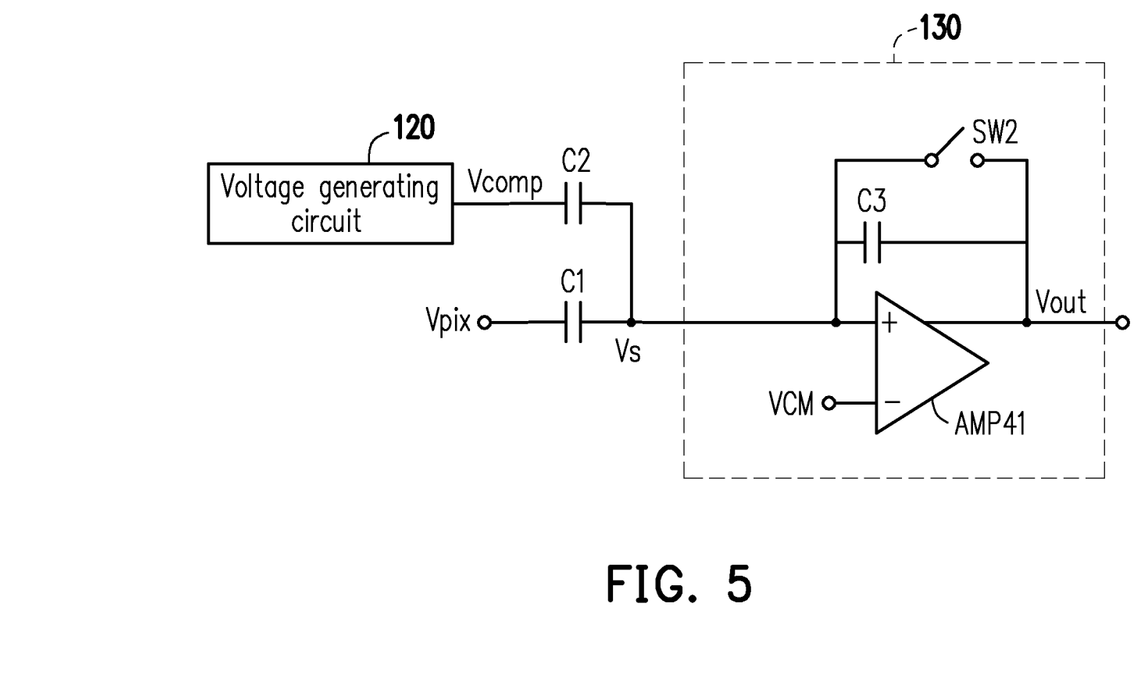
FIG. 5 is a schematic circuit block diagram of an AFE circuit according to another embodiment of the disclosure.

FIG. 5 is a schematic circuit block diagram of the AFE circuit 130 according to another embodiment of the disclosure. The AFE circuit 130 shown in FIG. 5 may be used as one of many implementation examples of the AFE circuit 130 shown in FIG. 1. The AFE circuit 130 shown in FIG. 5 includes an amplifier AMP41, a capacitor C3, and a switch SW2. The AFE circuit 130, the amplifier AMP41, the capacitor C3, and the switch SW2 shown in FIG. 5 may refer to the relevant descriptions of the AFE circuit 130, the amplifier AMP41, the capacitor C3, and the switch SW2 shown in FIG. 4 by analogy, so details are not repeated herein. The difference from the embodiment shown in FIG. 4 is that the AFE circuit 130 shown in FIG. 5 omits the switch SW1 shown in FIG. 4. The first input terminal (e.g., non-inverting input terminal) of the amplifier AMP41 is coupled to the second terminal of the capacitor C1. The second input terminal of the amplifier AMP41 (e.g., inverting input terminal) is coupled to the common mode voltage VCM.

Figure 6:
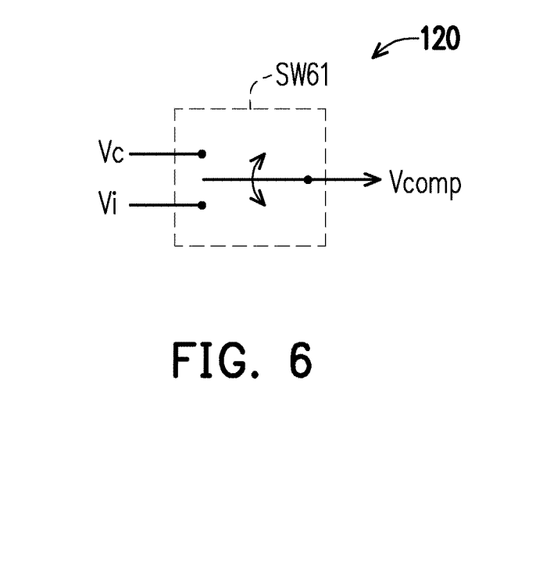
FIG. 6 is a schematic circuit block diagram of a voltage generating circuit according to an embodiment of the disclosure.

FIG. 6 is a schematic circuit block diagram of a voltage generating circuit 120 according to an embodiment of the disclosure. The voltage generating circuit 120 shown in FIG. 6 may be used as one of many implementation examples of the voltage generating circuit 120 shown in FIG. 1. The voltage generating circuit 120 shown in FIG. 6 includes a switch circuit SW61. A common terminal of the switch circuit SW61 is coupled to the second terminal of the capacitor C2 to provide the compensation voltage Vcomp. A first selection terminal of the switch circuit SW61 receives the voltage with the initial level Vi. A second selection terminal of the switch circuit SW61 receives voltage with the compensation level Vc.

Figure 7:
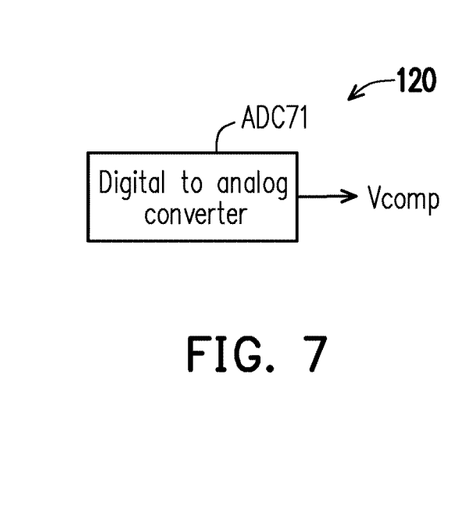
FIG. 7 is a schematic circuit block diagram of a voltage generating circuit according to another embodiment of the disclosure.

FIG. 7 is a schematic circuit block diagram of a voltage generating circuit 120 according to another embodiment of the disclosure. The voltage generating circuit 120 shown in FIG. 7 may be used as one of many implementation examples of the voltage generating circuit 120 shown in FIG. 1. The voltage generating circuit 120 shown in FIG. 7 includes a digital to analog converter (DAC) ADC71. An output terminal of the DAC ADC71 is coupled to the second terminal of the capacitor C2 to provide the compensation voltage Vcomp.

Figure 8:
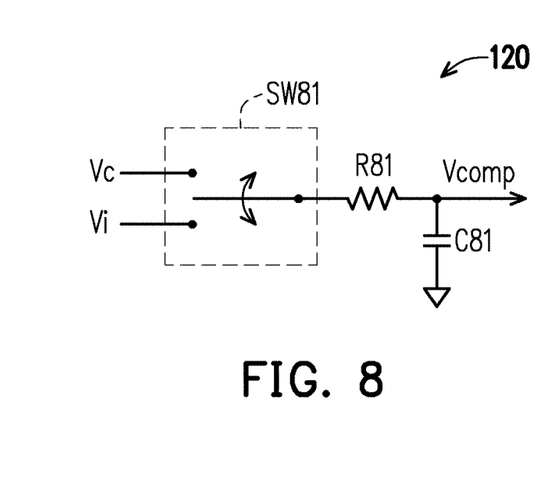
FIG. 8 is a schematic circuit block diagram of a voltage generating circuit according to yet another embodiment of the disclosure.

FIG. 8 is a schematic circuit block diagram of a voltage generating circuit 120 according to yet another embodiment of the disclosure. The voltage generating circuit 120 shown in FIG. 8 may be used as one of many implementation examples of the voltage generating circuit 120 shown in FIG. 1. The voltage generating circuit 120 shown in FIG. 8 includes a switch circuit SW81, a resistor R81, and a capacitor C81. A first selection terminal of the switch circuit SW81 receives the voltage with the initial level Vi. A second selection terminal of the switch circuit SW81 receives voltage with the compensation level Vc. A first terminal of the resistor R81 is coupled to a common terminal of the switch circuit SW81. A second terminal of the resistor R81 is coupled to the second terminal of the second capacitor C2 to provide the compensation voltage Vcomp. A first terminal of the capacitor C81 is coupled to the second terminal of the resistor R81. A second terminal of the capacitor C81 is coupled to a reference voltage (e.g., grounding voltage or other fixed voltage).

Figure 9:
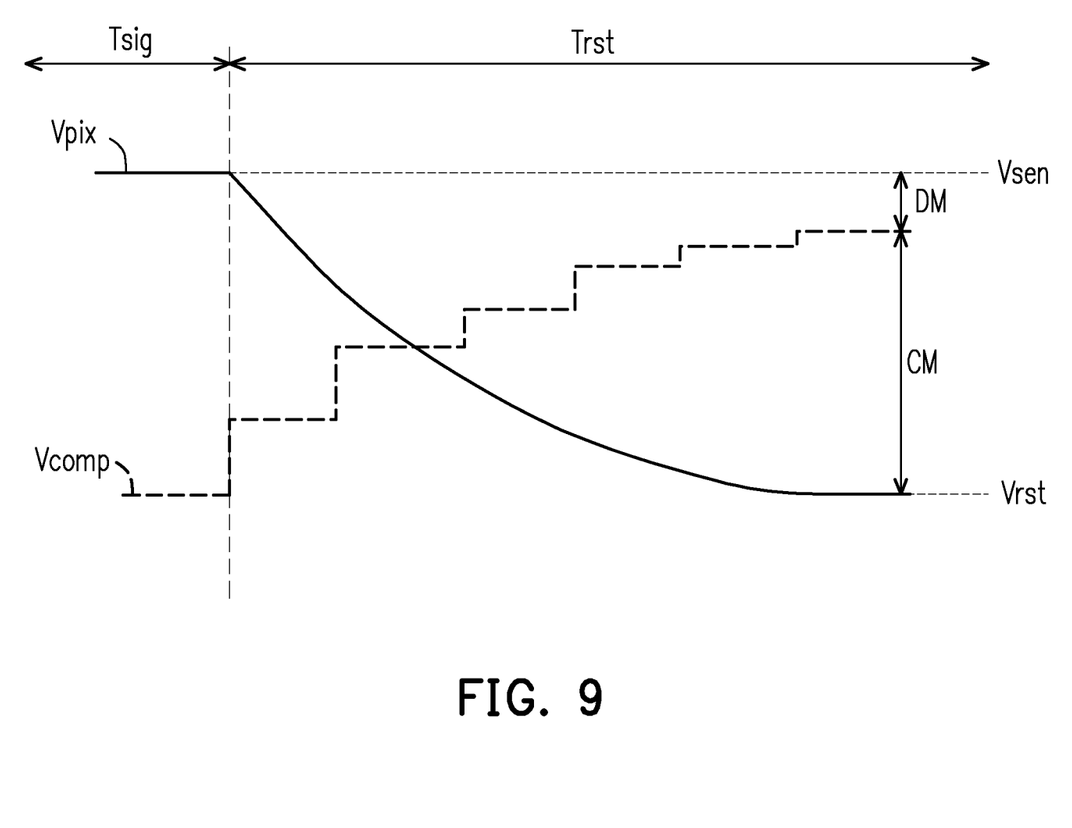
FIG. 9 is a waveform schematic diagram of a sensing voltage and a compensation voltage according to another embodiment of the disclosure.

The waveform of the compensation voltage Vcomp shown in FIG. 3 is one of many implementation examples. The waveform of the compensation voltage Vcomp may be determined according to the actual design. For example, FIG. 9 is a waveform schematic diagram of a sensing voltage Vpix and a compensation voltage Vcomp according to another embodiment of the disclosure. The horizontal axis in FIG. 9 represents time. The sensing voltage Vpix and the compensation voltage Vcomp shown in FIG. 9 may refer to relevant descriptions of the sensing voltage Vpix and the compensation voltage Vcomp shown in FIG. 3 by analogy. Referring to FIG. 1, FIG. 7, and FIG. 9, generally, the fingerprint sensing pixel and the sensing line of the display panel 10 have a parasitic resistor and a parasitic capacitor. Based on a delay of the resistor and the capacitor, during the process of the sensing voltage Vpix being reset from a certain signal level Vsen to the reset level Vrst, the sensing voltage Vpix drops to the reset level Vrst at a speed corresponding to a certain time constant (e.g., the waveform of the sensing voltage Vpix shown in FIG. 9). In order to timely compensate the current sensing voltage Vpix at different time points in the dropping process, the DAC ADC71 may gradually pull up the compensation voltage Vcomp in a stepwise manner (e.g., the waveform of the compensation voltage Vcomp shown in FIG. 9).

Figure 10:
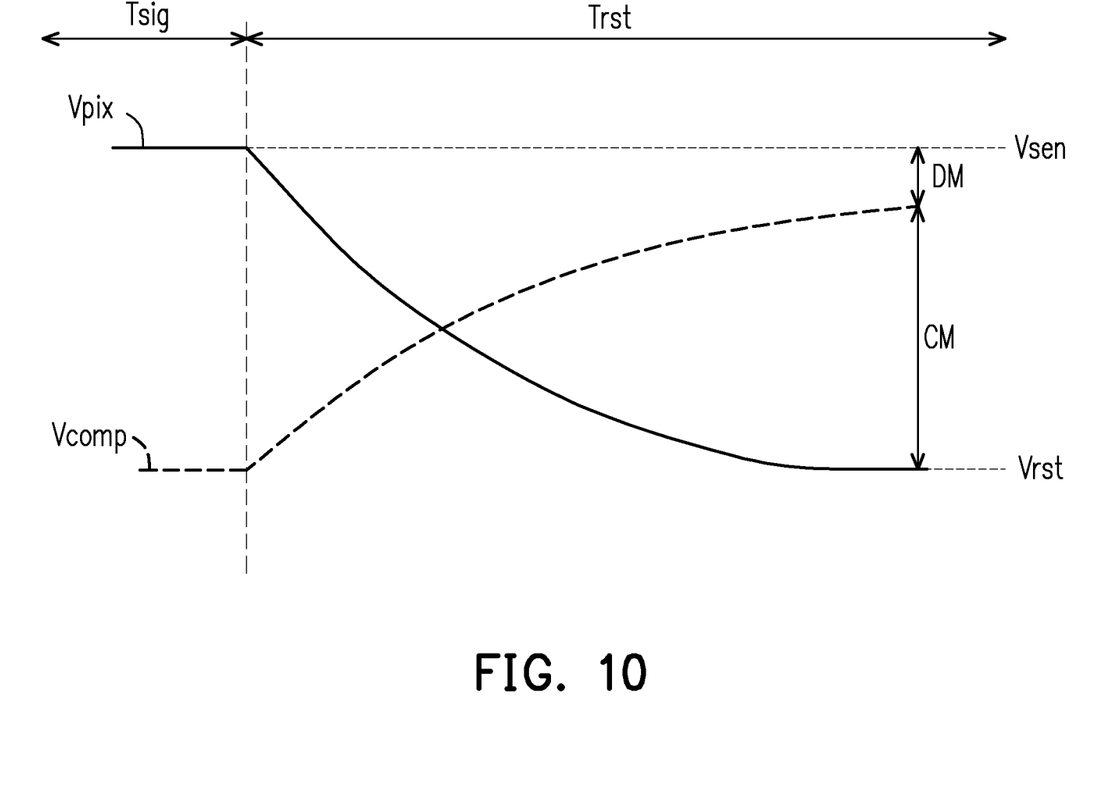
FIG. 10 is a waveform schematic diagram of a sensing voltage and a compensation voltage according to yet another embodiment of the disclosure.

FIG. 10 is a waveform schematic diagram of a sensing voltage Vpix and a compensation voltage Vcomp according to yet another embodiment of the disclosure. The horizontal axis in FIG. 10 represents time. The sensing voltage Vpix and the compensation voltage Vcomp shown in FIG. 10 may refer to relevant descriptions of the sensing voltage Vpix and the compensation voltage Vcomp shown in FIG. 3 by analogy. Referring to FIG. 1, FIG. 8, and FIG. 10, generally, the fingerprint sensing pixel and the sensing line of the display panel 10 have a parasitic resistor and a parasitic capacitor. Thus, the sensing voltage Vpix drops to the reset level Vrst at a speed corresponding to a certain time constant (e.g., the waveform of the sensing voltage Vpix shown in FIG. 10). In order to timely compensate the current sensing voltage Vpix at different time points in the dropping process, the resistance of the resistor R81 and the capacitance of the capacitor C81 shown in FIG. 8 may be adjusted so as to adapt to the resistance of the parasitic resistor 1 and the capacitance of the parasitic capacitor of the display panel 10. Thus, based on a delay between the resistor R81 and the capacitor C81, during the process of the compensation voltage Vcomp being pulled up, the compensation voltage Vcomp rises at a speed corresponding to a certain time constant (e.g., the waveform of the compensation voltage Vcomp shown in FIG. 10).

To sum up, the pixel reading device 100 described in the above-mentioned embodiments prevent the AFE circuit 130 from operating in positive and negative pressure domains through capacitance coupling. Through capacitance coupling, the positive variation of the compensation voltage Vcomp may offset the negative variation of the sensing voltage Vpix. That is, an invalid common mode component CM in the sensing voltage Vpix generated by the long-term exposure of the fingerprint sensing pixel P11 may be eliminated. In response to the fingerprint sensing pixel P11 being reset, the sensing voltage Vpix is pulled down to the reset level Vrst (e.g., negative voltage level). Moreover, during the level reading period Trst of the fingerprint sensing pixel P11, the compensation voltage Vcomp is instantly pulled up from the initial level Vi to a compensation level Vc to compensate the common mode component CM of the sensing voltage Vpix. Thus, the voltage of the input terminal of the AFE circuit may operate in a positive voltage range, so that the AFE circuit may read the output voltage (sensing voltage) of the fingerprint sensing pixel embedded in the display panel. In the process of compensating the common mode component CM of the sensing voltage Vpix by the compensation voltage Vcomp, the pixel reading device 100 does not affected the normal operation of the AFE circuit 130.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A pixel reading device, comprising:
    a first capacitor, having a first terminal coupled to a fingerprint sensing pixel to receive a sensing voltage;
    a second capacitor, having a first terminal coupled to a second terminal of the first capacitor;
    a voltage generating circuit, coupled to a second terminal of the second capacitor to provide a compensation voltage, wherein the compensation voltage is at an initial level during a sensing period of the fingerprint sensing pixel, and the compensation voltage is pulled up from the initial level to a compensation level during a level reading period of the fingerprint sensing pixel to compensate a common mode component of the sensing voltage; and
    an analog front-end circuit, having an input terminal coupled to the second terminal of the first capacitor.

2. The pixel reading device according to claim 1, wherein in a first phase of the level reading period, the sensing voltage of the fingerprint sensing pixel has not yet been reset, and the compensation voltage is pulled up to the compensation level;
    in a second phase of the level reading period, the sensing voltage is reset, and the compensation voltage continues to be pulled up to the compensation level; and
    in a third phase of the level reading period, the sensing voltage is continuously reset, and the compensation voltage is maintained at the compensation level.

3. The pixel reading device according to claim 1, wherein the voltage generating circuit comprises:
    a digital to analog converter, having an output terminal coupled to the second terminal of the second capacitor to provide the compensation voltage.

4. The pixel reading device according to claim 1, wherein the voltage generating circuit comprises:
    a switch circuit, having a common terminal coupled to the second terminal of the second capacitor to provide the compensation voltage, wherein a first selection terminal of the switch circuit receives a first voltage with the initial level, and a second selection terminal of the switch circuit receives a second voltage with the compensation level.

5. The pixel reading device according to claim 1, wherein the voltage generating circuit comprises:
    a switch circuit, having a first selection terminal receiving a first voltage having the initial level, wherein a second selection terminal of the switch circuit receives a second voltage with the compensation level;
    a resistor, having a first terminal coupled to a common terminal of the switch circuit, wherein a second terminal of the resistor is coupled to the second terminal of the second capacitor to provide the compensation voltage; and
    a third capacitor, having a first terminal coupled to the second terminal of the resistor, wherein a second terminal of the third capacitor is coupled to a reference voltage.

6. The pixel reading device according to claim 1, wherein the analog front-end circuit comprises:
    a first switch, having a first terminal coupled to the second terminal of the first capacitor;
    an amplifier, having a first input terminal coupled to a second terminal of the first switch, wherein a second input terminal of the amplifier is coupled to a common mode voltage;
    a third capacitor, having a first terminal coupled to the first input terminal of the amplifier, wherein a second terminal of the third capacitor is coupled to an output terminal of the amplifier; and
    a second switch, having a first terminal coupled to the first input terminal of the amplifier, wherein a second terminal of the second switch is coupled to the output terminal of the amplifier.

7. The pixel reading device according to claim 1, wherein the analog front-end circuit comprises:
    an amplifier, having a first input terminal coupled to the second terminal of the first capacitor, wherein a second input terminal of the amplifier is coupled to a common mode voltage;
    a third capacitor, having a first terminal coupled to the first input terminal of the amplifier, wherein a second terminal of the third capacitor is coupled to an output terminal of the amplifier; and
    a switch, having a first terminal coupled to the first input terminal of the amplifier, wherein a second terminal of the switch is coupled to the output terminal of the amplifier.

8. The pixel reading device according to claim 1, further comprising:
    a current source, coupled to the fingerprint sensing pixel to provide a sensing current.

9. A pixel reading method, comprising:
    receiving a sensing voltage of a fingerprint sensing pixel by an input terminal of an analog front-end circuit through a first capacitor; and
    providing a compensation voltage to the input terminal of the analog front-end circuit by a voltage generating circuit through a second capacitor, wherein,
    during a sensing period of the fingerprint sensing pixel, the compensation voltage is at an initial level; and
    during a level reading period of the fingerprint sensing pixel, the compensation voltage is pulled up from the initial level to a compensation level to compensate a common mode component of the sensing voltage.

10. The pixel reading method according to claim 9, wherein pulling up the compensation voltage from the initial level to the compensation level comprises:
    raising the compensation voltage to the compensation level in a first phase of the level reading period, wherein the sensing voltage of the fingerprint sensing pixel has not yet been reset in the first phase;
    continuing to pull up the compensation voltage to the compensation level in a second phase of the level reading period, wherein the sensing voltage is reset in the second phase; and maintaining the compensation voltage at the compensation level in a third phase of the level reading period, wherein the sensing voltage is continuously reset in the third phase.

* * * * *